(12) United States Patent
Lee

(10) Patent No.: US 8,391,297 B2
(45) Date of Patent: Mar. 5, 2013

(54) METHOD FOR TRANSMITTING EXTENDED PROTOCOL MESSAGE TO CONTROL SUBSCRIBER SERVICES OF CONNECTION-ORIENTED ETHERNET

(75) Inventor: Won Kyoung Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 301 days.

(21) Appl. No.: 12/939,781

(22) Filed: Nov. 4, 2010

(65) Prior Publication Data

US 2011/0134927 A1  Jun. 9, 2011

(30) Foreign Application Priority Data

Dec. 7, 2009 (KR) .................. 10-2009-0120539
Jul. 8, 2010 (KR) .................. 10-2010-0065957

(51) Int. Cl.
*H04L 12/28* (2006.01)
*H04L 12/56* (2006.01)
(52) U.S. Cl. ....................... 370/400; 370/392
(58) Field of Classification Search .............. 370/389, 370/392, 400
See application file for complete search history.

(56) References Cited

U.S. PATENT DOCUMENTS 7,301,949 B2  11/2007  Eriksson

2006/0083251 A1*  4/2006  Kataoka et al. ............... 370/400

OTHER PUBLICATIONS

Cisco Systems, Inc., "Cisco Segmented Generalized Multiprotocol Label Switching for the IP Next-Generation Network," White paper, retreived online at http://www.cisco.com/en/US/prod/collateral/routers/ps5763/prod_white_paper0900aecd80471898.html (1992-2006).

* cited by examiner

*Primary Examiner* — Ronald Abelson
(74) *Attorney, Agent, or Firm* — Nelson Mullins Riley & Scarborough LLP; EuiHoon Lee, Esq.

(57) ABSTRACT

In order to transmit an extended protocol message for the purpose of controlling a service of a connection-oriented Ethernet including a plurality of nodes, when an LSP (Label Switched Path) generation request message is received, a path message including an object for delivery of upstream service frame information and an object modified for the transmission of traffic information of a service frame for downstream traffic policing is generated, the path message including the LSP generation request message. When a second node, one of the plurality of nodes, receives the path message from the first node, it generates a reservation (RESV) message including an object added for the transmission of a downstream service frame information and an object modified for the transmission of traffic information of a service frame for upstream traffic policing in response to the LSP generation request message.

6 Claims, 9 Drawing Sheets

FIG.5

| Length | ESP VID (B-VID) | Class-Num(=16)<br>(RSVP_LABEL) | C-type(=2)<br>(Generalized_Label) |
|---|---|---|---|
| ESP MAC (highest 2 bytes) | | | |
| ESP MAC (B-DA) | | | |

FIG.7A

| Length | Class-Num(=12) | C-type(6) |
| Switching Granularity | | MTU |
| TLV | | |

METHOD FOR TRANSMITTING EXTENDED PROTOCOL MESSAGE TO CONTROL SUBSCRIBER SERVICES OF CONNECTION-ORIENTED ETHERNET

CROSS-REFERENCE TO RELATED APPLICATION

This application claims priority to and the benefit of Korean Patent Application No. 10-2009-0120539 and 10-2010-0065957 filed in the Korean Intellectual Property Office on Dec. 7, 2009 and Jul. 8, 2010, the entire contents of which are incorporated herein by reference.

BACKGROUND OF THE INVENTION (a) Field of the Invention

The present invention relates to a method for transmitting an extended protocol message to control subscriber services of a connection-oriented Ethernet.

(b) Description of the Related Art

A control plane refers to a conceptual plane on which control signals, which are used for controlling, configuring, maintaining, releasing, and the like, of communication connections in a network, flow. GMPLS (Generalized Multi-Protocol Label Switching), one of the techniques of the control plane, has been extended, starting from a protocol for controlling an MPLS network, to a protocol for controlling a WDM (Wavelength Division Multiplexing) and SONET/SDH (Synchronous Optical Network/Synchronous Digital Hierarchy) network. Currently, GMPLS extends to control Ethernet.

Ethernet, which has been evolved from an L2VPN (Layer 2 Virtual Private Network) of an access network to carrier Ethernet of a metro core network, currently extends to a packet-based transmission technique of a backbone network. Thus, the GMPLS technique needs to extend to a standardized transmission control plane capable of controlling a connection-oriented Ethernet backbone network.

That is, services that can be supported by a packet-based transport layer (PLT) include a C-TAG frame, PB (Provider Bridging)-based S-TAG frame, and a PBB (Provider Backbone Bridge)-based I-TAG or B-TAG frame of EPL (Ethernet Private Line) or EVPL (Ethernet Virtual Private Line) service. However, currently, only a UNI (User to Network Interface) and a PBB-TE (Provider Backbone Bridges Traffic Engineering) of the GMPLS technique are under standardization, and a part for supporting and controlling services of various frames must be necessarily set in a management plane directly by an operator.

Thus, in order for the GMPLS technique to completely automatically control the connection-oriented Ethernet backbone network, the GMPLS technique must necessarily control Ethernet services of various frames supported by a backbone edge bridge.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for transmitting an extended protocol message to control subscriber services of a connection-oriented Ethernet having advantages of automatically controlling Ethernet subscriber services of various frames.

An exemplary embodiment of the present invention provides a method for transmitting an extended protocol message to control subscriber services of a connection-oriented Ethernet including a plurality of nodes, including: receiving, by a first node, one of the plurality of nodes, a label switched path (LSP) generation request message from an external source; generating, by the first node, a path message including an object for delivery of upstream service frame information and an object modified for the transmission of traffic information of a service frame for downstream traffic policing, the path message including the LSP generation request message; generating, by a second node which is one of the plurality of nodes and receives the path message from the first node, a reservation (RESV) message including an object added for the transmission of a downstream service frame information and an object modified for the transmission of traffic information of a service frame for upstream traffic policing in response to the LSP generation request message; and transmitting, by the second node, the generated RESV message to the first node

BRIEF DESCRIPTION OF THE DRAWINGS

FIG. 5 illustrates an example of the format of a <UPSTREAM_LABEL> object and a <LABEL> object according to an exemplary embodiment of the present invention.

FIG. 7A illustrates an example of the format of a general <SENDER_TSPEC> object.

DETAILED DESCRIPTION OF THE EMBODIMENTS

Figure 1:
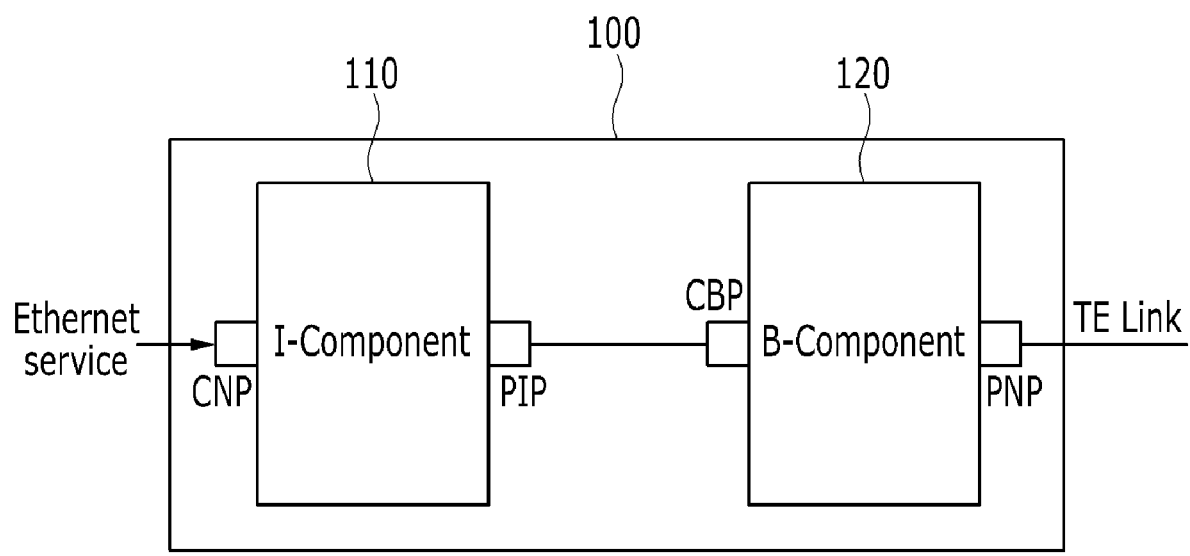
FIG. 1 is a schematic block diagram showing the structure of a backbone edge bridge according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

A method for extending an RSVP-TE (Resource Reservation Protocol-Traffic Engineering) protocol of GMPLS to control subscriber services of a connection-oriented Ethernet according to exemplary embodiments of the present invention will now be described with reference to the accompanying drawings.

FIG. 1 is a schematic block diagram showing the structure of a backbone edge bridge according to an exemplary embodiment of the present invention.

As shown in FIG. 1, a backbone bridge 100 includes an I-component 110, which supports an Ethernet service, providing a service instance, and a B-component 120 generating a bi-directional Ethernet LSP (Label Switched Path), a connection-oriented path, based on the service instance. Functions of a PIP (Provider Instance Port), a CBP (Customer Backbone Port), and a PNP (Provider Network Port) illustrated in FIG. 1 have been generally known, so a detailed description thereof will be omitted.

In general, the GMPLS controls only the B-component 120 of the backbone edge bridge corresponding to a connection-oriented path. However, in an exemplary embodiment of the present invention, frame and traffic information of an Ethernet service supported by a customer network port (CNP) of the I-component 110 is included in a GMPLS signaling protocol and then transferred to the GMPLS, so that the GMPLS can control even a UNI (User to Network Interface) as well as an NNI (Network to Network Interface).

A method for transmitting a GMPLS RSVP-TE protocol message including the frame and traffic information of the Ethernet service will now be described with reference to FIG. 2.

Figure 2:
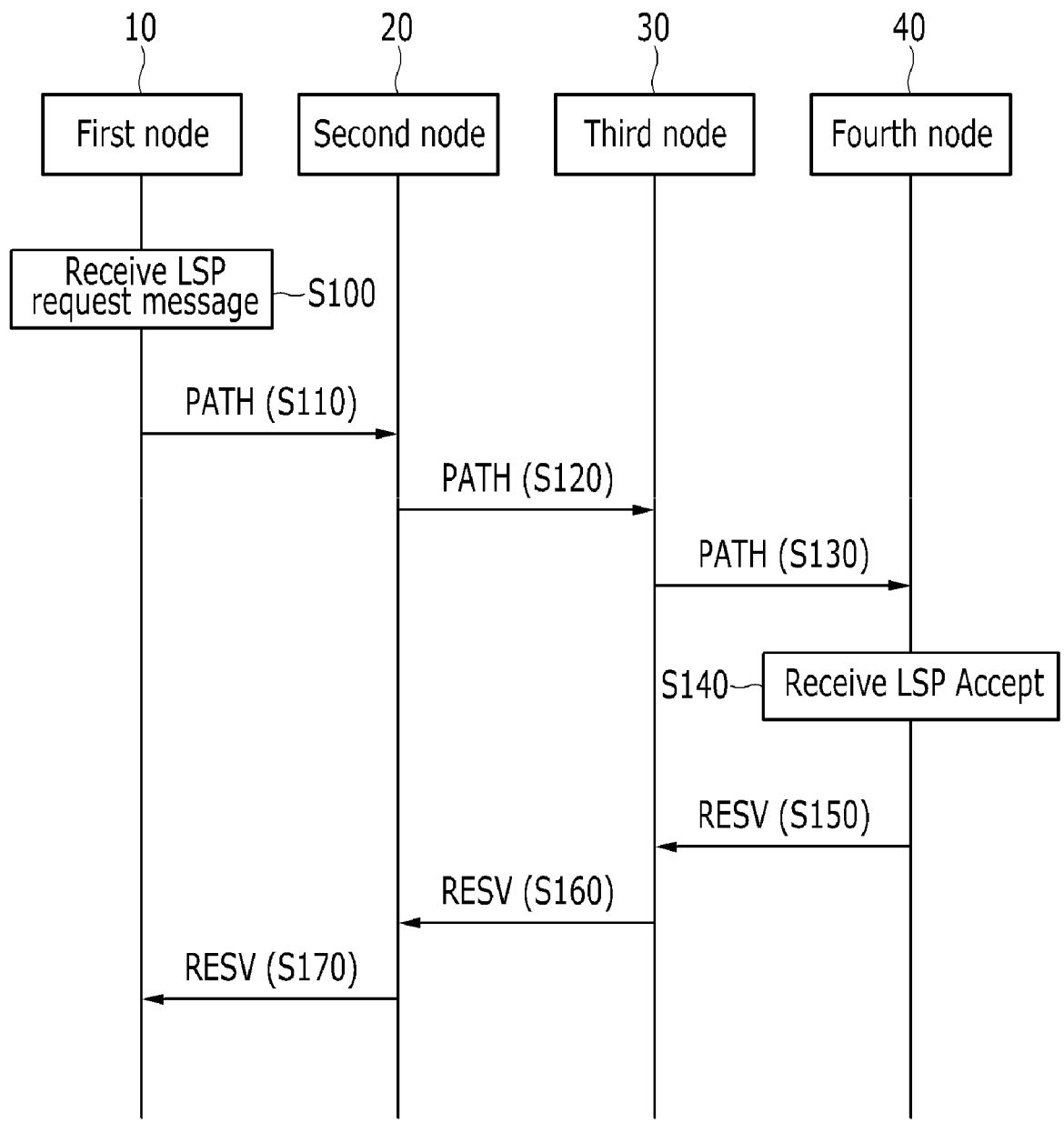
FIG. 2 is a flowchart illustrating the process of a method for transmitting a protocol message according to an exemplary embodiment of the present invention.

FIG. 2 is a flowchart illustrating the process of a method for transmitting a protocol message according to an exemplary embodiment of the present invention.

In an exemplary embodiment of the present invention, it is assumed that four nodes (a first node 10 to a fourth node 40) are connected. Based on the assumption, a case in which the first node 10 requests the fourth node 40 to generate an LSP and the fourth node 40, which can generate the LSP, responds to the request will be described as an example.

The first node 10 receives an LSP generation request message requesting to generate an LSP in the fourth node 400 through a CLI (Command Line Interface) or an SNMP (Simple Network Management Protocol), from an operator (S100). Then, in order to transfer the LSP generation request message to the fourth node 40, the first node 10 generates a PATH message from an RSVP-TE protocol engine and includes the LSP generation request message in the generated PATH message.

Here, each node refers to a GMPLS protocol stack-mounted system and is implemented in a form in which the RSVP-TE protocol engine of the GMPLS is included in the GMPLS protocol stack. Then, the PATH message including the LSP generation request message transmitted from the first node 10 is transmitted to the fourth node 40 through the second node 20 and the third node 30, the intermediate nodes between the first node 10 and the fourth node 40 (S110 to S130). In this case, in order to allow for recognition of the destination of the PATH message that has been transmitted from the first node 10, identification information of the fourth node 40 is included in the PATH message.

Figure 3:
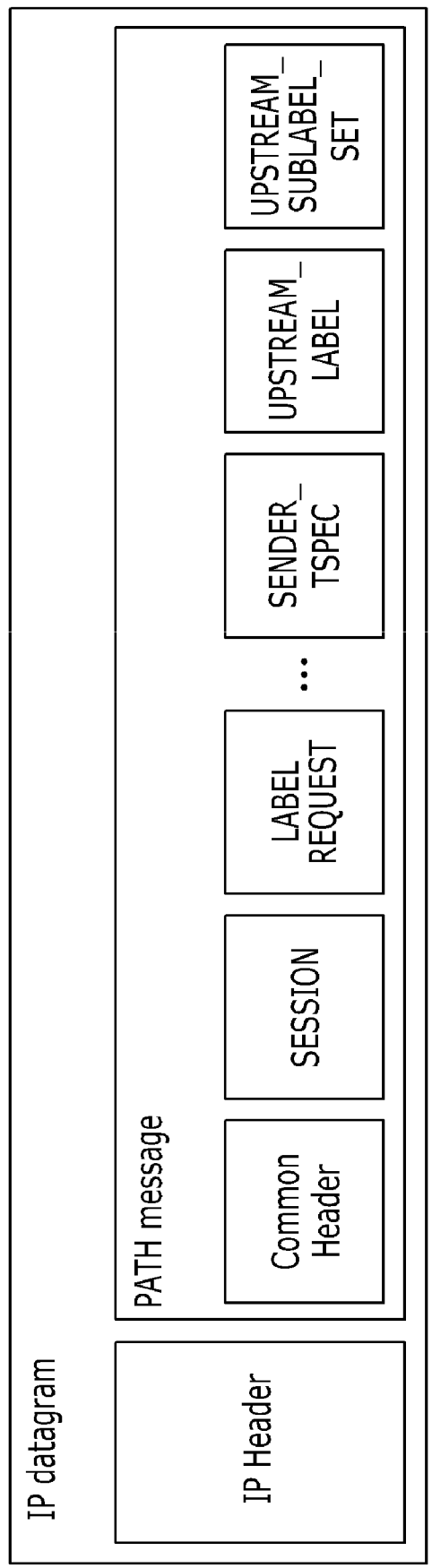
FIG. 3 illustrates an example of a path message format according to an exemplary embodiment of the present invention.

In order to transmit service frame information (C tag frame, S tag frame, I tag frame, and B tag frame) supported by the backbone edge bridge to the fourth node 40, the format of the PATH message transmitted from the first node 10 is defined as shown in Table 1 below, and FIG. 3 shows the format of the PATH message.

TABLE 1

<Path Message> :: = <Common Header> [<INTEGRITY>]
    [[<MESSAGE_ID_ACK>|<MESSAGE_ID_NACK>]...]
    [<MESSAGE_ID>]
    <SESSION> <RSVP_HOP>
    <CALL_ID>
    <TIME_VALUES>
    [<EXPLICIT_ROUTE>]
    <LABEL_REQUEST>
    [<PROTECTION>]
    [<LABEL_SET>...]
    [<CALL_ATTRIBUTES>]
    [<SESSION_ATTRIBUTES>]
    [<NOTIFY_REQUEST>]
    [<ADMIN+STATUS>]
    [<POLICY_DATA>...]
    <sender descriptor>
<sender descriptor>::= <SENDER_TEMPLATE> <SENDER_TSPEC>
    [<ADSPEC>]
    [<RECORD_ROUTE>]
    [<SUGGESTED_LABEL>]
    [<RECOVERY_LABEL>]
    <UPSTREAM_LABEL>
    [<UPSTREAM_FLOWSPEC>]
    [<UPSTREAM_SUBLABEL_SET>]

Here, in an exemplary embodiment of the present invention, in order to transfer the upstream service frame information, an <UPSTREAM_SUBLABEL_SET> object is added and TLV of a <SENDER_TSPEC> object is modified in order to transfer traffic information of the service frame for downstream ingress policing as shown in the format of the PATH message illustrated in FIG. 3.

When the foregoing PATH message is transferred to the fourth node 40, the fourth node 40 checks whether or not it can generate an LSP based on the LSP request message included in the PATH message that has been transmitted from the first node 10. That is, the respective nodes include a resource manager, so the respective nodes can check whether or not they can generate an LSP.

When the fourth node 40 can generate an LSP, it receives a confirmation message (LAP Accept) from the resource manager (S140). Then, in order to transfer the information regarding the LSP approval to the first node 10, the fourth node 40 generates a reservation (RESV) message. Like the PATH message, the RESV message is also generated by the RSVP-TE protocol engine.

The thusly generated RESV message is transferred to the first node 10, which has initially requested the generation of the LSP, through the third node 30 and the second node 20 (S150 to S170). The RESV message includes identification information of the first node 10, so as to be transmitted to the first node 10. The RESV message has such a format as shown in Table 2 below and FIG. 4.

TABLE 2

<Resv Message> :: = <Common Header> [<INTEGRITY>]
    [[<MESSAGE_ID_ACK>|<MESSAGE_ID_NACK>]...]
    [<MESSAGE_ID>]
    <SESSION> <RSVP_HOP>
    <CALL_ID>
    <TIME_VALUES>
    [<RESV_CONFIRM>] [<SCOPE>]
    [<NOTIFY_REQUEST>]
    [<ADMIN_STATUS>]
    [<POLICY_DATA>...]
    [<STYLE>] <flow descriptor list>

TABLE 2-continued

```
<flow descriptor list>::= <FF flow descriptor list>
    | <SE flow descriptor>
<FF flow descriptor list>::=    <FLOWSPEC>
                                <UPSTREAM_TSPEC>
                                [<UPSTREAM_ADSPEC>]
                                <FILTER_SPEC>
                                <LABEL>
                                <SUBLABEL_SET>
                                [<RECORD_ROUTE>]
                                |<FF flow descriptor list>
                                <FF flow descriptor>
<SE flow descriptor>::=         <FLOWSPEC>
                                <UPSTREAM_TSPEC>
                                [<UPSTREAM_ADSPEC>]
                                <SE filter spec list>
```

Figure 4:
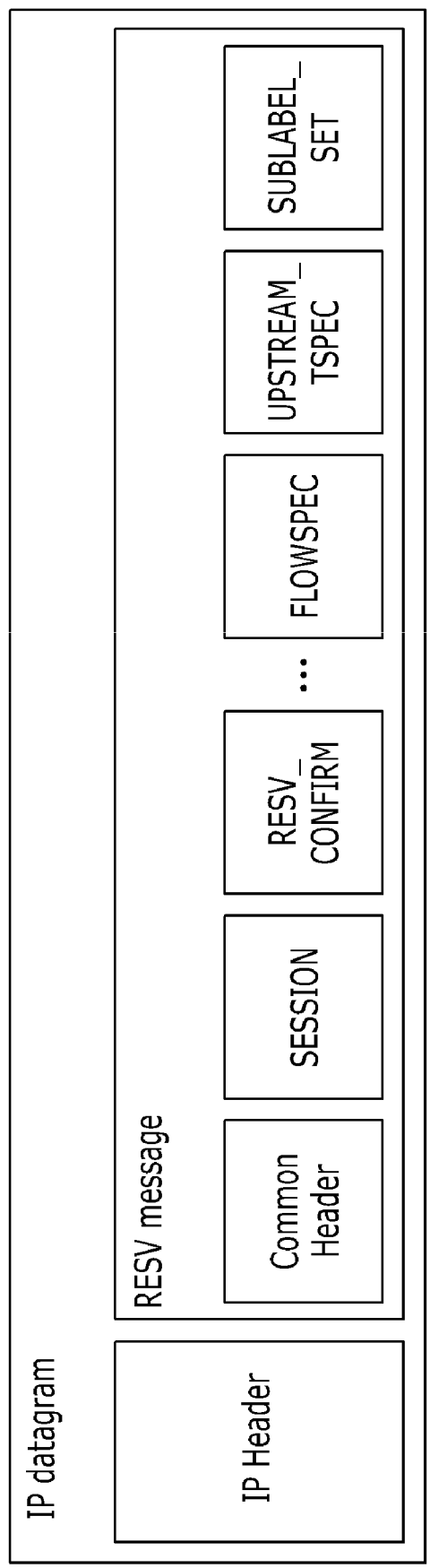
FIG. 4 illustrates an RESV message format according to an exemplary embodiment of the present invention.

In the RESV message format as illustrated in FIG. 4 according to an exemplary embodiment of the present invention, a <SUBLABEL_SET> object is added in order to transfer downstream service frame information, and TLV of an <UPSTREAM_TSPEC> object has been modified to transfer traffic information of a service frame for upstream egress policing.

As for new objects in Table 1 and Table 2, the concept of a SUB_LABEL_SET modified from the format of a LABEL_SET object is adopted. Various object formats according to an exemplary embodiment of the present invention will now be described.

FIG. 5 illustrates an example of the format of a <UPSTREAM_LABEL> object and a <LABEL> object according to an exemplary embodiment of the present invention.

As shown in FIG. 5, the <UPSTREAM_LABEL> object and the <LABEL> object transfer bi-directional path information of a packet transport layer, that is, a connection-oriented path of the backbone edge bridge. The <UPSTREAM_LABEL> object is included in the format of the PATH message as shown in FIG. 3. In this case, the <UPSTREAM_LABEL> object and the <LABEL> object use a generalized label format.

Figure 6:
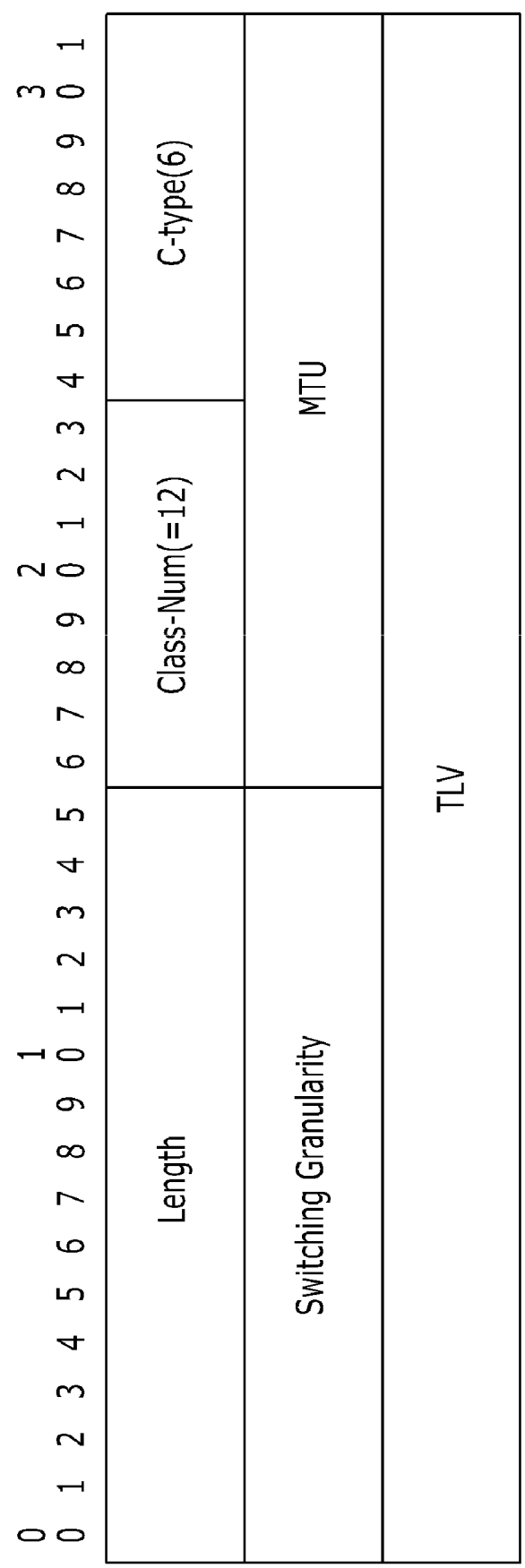
FIG. 6 illustrates an example of the format of an <UPSTREAM_SUBLABEL_SET> object and an <SUBLABEL_SET> object according to an exemplary embodiment of the present invention.

FIG. 6 illustrates an example of the format of an <UPSTREAM_SUBLABEL_SET> object and an <SUBLABEL_SET> object according to an exemplary embodiment of the present invention.

As shown in FIG. 6, the <UPSTREAM_SUBLABEL_SET> object and the <SUBLABEL_SET> object transfer bi-directional service frame information. The <UPSTREAM_SUBLABEL_SET> object and the <SUBLABEL_SET> object are included in the format of the RESV message illustrated in FIG. 4. These objects have a format similar to that of a Generalized Label Set, but they include a field for discriminating a service type.

Thus, the <UPSTREAM_SUBLABEL_SET> object and the <SUBLABEL_SET> object include Class number and C-type. Here, Class number is RSVP_SUBLABEL, and C-type is defined as a Generalized Sublabel Set but is not necessarily limited thereto.

Figure 7B:
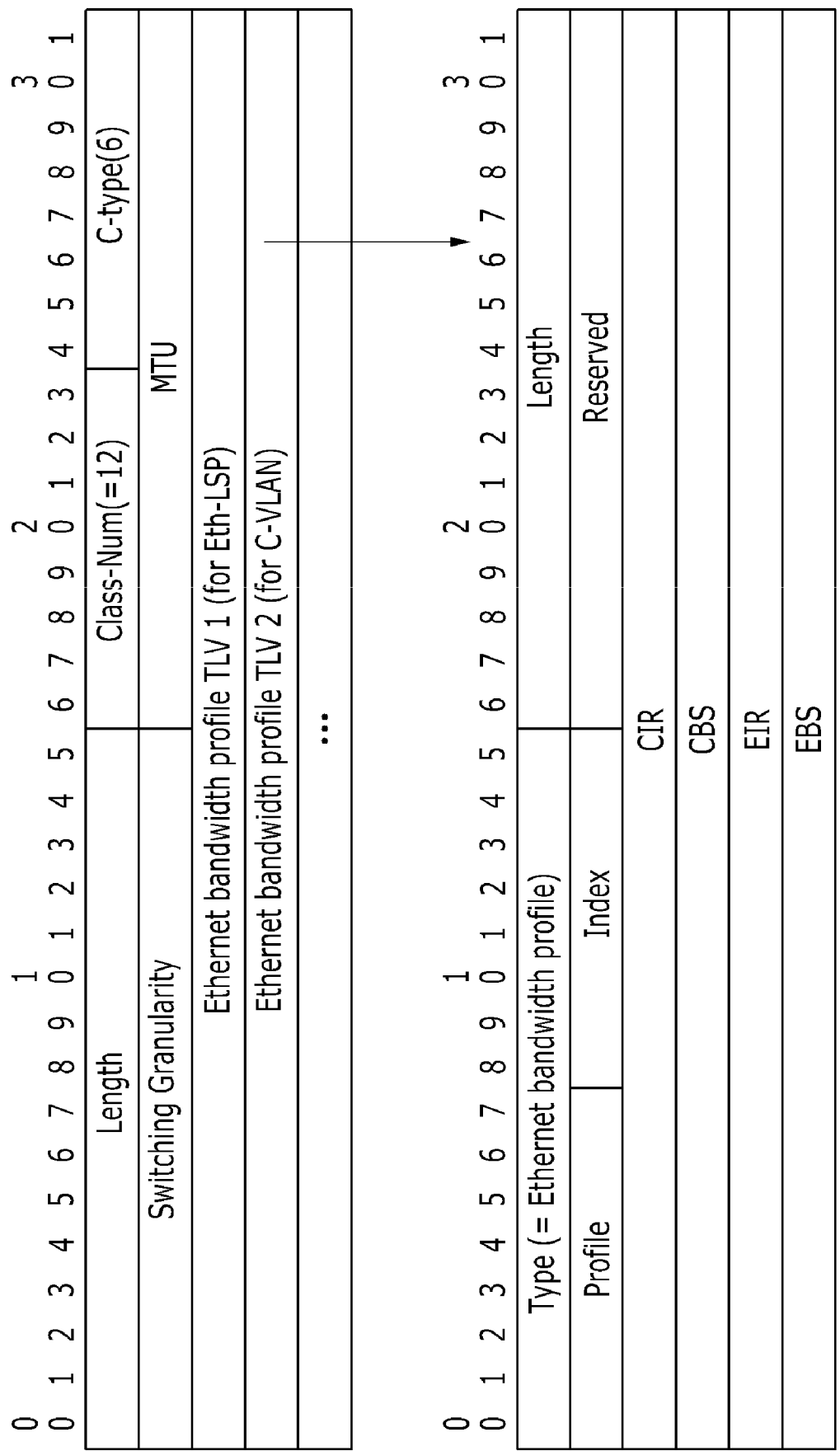
FIG. 7B illustrates an example of the format of a <SENDER_TSPEC> object according to an exemplary embodiment of the present invention.

FIG. 7A illustrates an example of the format of a general <SENDER_TSPEC> object, and FIG. 7B illustrates an example of the format of a <SENDER_TSPEC> object according to an exemplary embodiment of the present invention.

In order to transfer the traffic information of the UNI service frame supported by the backbone edge bridge, some objects of the PATH and the RESV message must be altered. In this case, in order to support an asymmetrical bandwidth of the bi-directional Ethernet LSP, upstream and downstream objects must be set to be different. Also, in order to transfer the traffic information of the UNI service frame, an exemplary embodiment of the present invention proposes a hierarchical bandwidth TLV concept obtained by modifying the SENDER_TSPEC object.

That is, as shown in FIG. 7A, a general SENDER_TSPEC object delivers only Ethernet LSP (Eth-LSP) traffic information. In comparison, as shown in FIG. 7B, an Ethernet bandwidth profile TLV1 (Type, Length, Value) of the SENDER_TSPEC object according to an exemplary embodiment of the present invention delivers general downstream Ethernet LSP (Eth-LSP) traffic information, and an Ethernet bandwidth profile TLV2 delivers traffic information with respect to a UNI service frame of an ingress edge node. Here, the SENDER_TSPEC object is one of objects included in the PATH message format.

Currently, switching granularity is allocated only to EPL (Ethernet Private Line) and EVPL (Ethernet Virtual Private Line) services. However, 802_1 PBB-TE is allocated to a switching type of a LABEL_REQUEST object. Thus, in order to control the backbone edge bridge, an Ethernet LSP (CO-Ethernet) must be added to the switching granularity. A Reserved field is used to discriminate a service in the Ethernet bandwidth profile TLV2.

Meanwhile, an UPSTREAM_FLOWSPEC object of the PATH message or a FLOWSPEC object of the RESV message only need to deliver resource allocation information of the Ethernet LSP, and it has nothing to do with service control. Thus, the UPSTREAM_FLOWSPEC object of the PATH message or the FLOWSPEC object of the RESV message uses the conventional format as it is.

Figure 8:
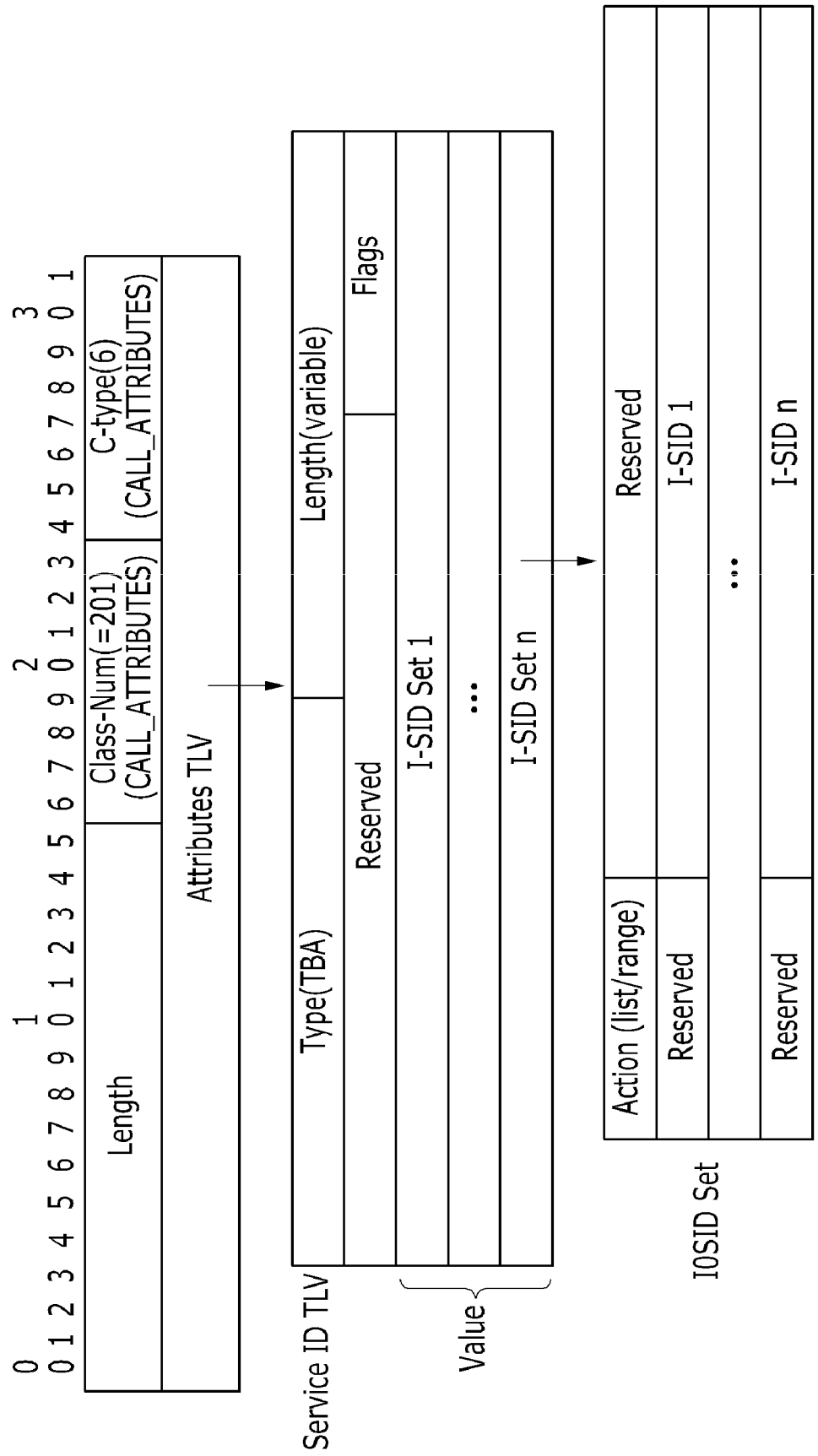
FIG. 8 illustrates an example of the format of a <CALL_ATTRIBUTES> according to an exemplary embodiment of the present invention.

FIG. 8 illustrates an example of the format of a <CALL_ATTRIBUTES> according to an exemplary embodiment of the present invention.

Combination of the UNI service frame supported by the backbone edge bridge and the Ethernet LSP is made by including I-SID (I-Service Instance VLAN ID) information in a CALL_ATTRIBUTES object and transferring the same. The CALL_ATTRIBUTES object is one of objects included in the format of the PATH message.

Also, when an Attributes TLV indicating upstream or downstream service frame information is added behind a service ID TLV of the CALL_ATTRIBUTES object, service frame information supported by a BEB can be transmitted through the CALL_ATTRIBUTES of the PATH message.

In this manner, various types of services can be supported by extending the RSVP-TE protocol, and because the frame and traffic information of the Ethernet service accepted by a CNP port of the I-component can be included in the GMPLS signaling protocol so as to be transmitted, even the UNI, as well as the NNI, can be controlled by the GMPLS.

According to an exemplary embodiment of the present invention, information regarding an Ethernet service is included in an RSVP-TE protocol, a GMPLS signaling protocol, and is then transferred between backbone edge bridges, whereby Ethernet subscriber services of various frames can be automatically controlled.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting an extended protocol message to control subscriber services of a connection-oriented Ethernet including a plurality of nodes, the method comprising:

receiving, by a first node, one of the plurality of nodes, a label switched path (LSP) generation request message from an external source;

generating, by the first node, a path message including an object for delivery of upstream service frame information and an object modified for the transmission of traffic information of a service frame for downstream traffic policing, the path message including the LSP generation request message;

generating, by a second node which is one of the plurality of nodes and receives the path message from the first node, a reservation (RESV) message including an object added for the transmission of a downstream service frame information and an object modified for the transmission of traffic information of a service frame for upstream traffic policing in response to the LSP generation request message; and transmitting, by the second node, the generated RESV message to the first node.

2. The method of claim 1, wherein the path message transmitted to the second node includes service frame information supported by a backbone edge bridge.

3. The method of claim 1, wherein the object modified for the transmission of traffic information comprises downstream Ethernet LSP traffic information and traffic information regarding a service frame of an ingress edge node.

4. The method of claim 1, wherein the object for delivery of upstream service frame information is an UPSTREAM_SUBLABEL_SET object, and the object modified for the transmission of traffic information is a SENDER_TSPEC object.

5. The method of claim 1, wherein the objects of the RESV message comprise class type information discriminating a class number and a service type.

6. The method of claim 5, wherein the object added for the transmission of a downstream service frame information of the RESV message is a SUBLABEL_SET object, and the object modified for the transmission of traffic information of the RESV message is an UPSTREAM_TSPEC object.

* * * * *